United States Patent

Hall et al.

Patent Number: 5,461,932
Date of Patent: Oct. 31, 1995

[54] SLOTTED ORIFICE FLOWMETER

[75] Inventors: Kenneth R. Hall; Gerald L. Morrison, both of College Station; James C. Holste, Bryan, all of Tex.

[73] Assignee: Texas A & M University System, College Station, Tex.

[21] Appl. No.: 188,050

[22] Filed: Jan. 26, 1994

Related U.S. Application Data

[63] Continuation-in-part of Ser. No. 729,934, Jul. 15, 1991, Pat. No. 5,295,397.

[51] Int. Cl.$^6$ .................................. G01F 1/42; F15D 1/02
[52] U.S. Cl. .................................. 73/861.61; 138/40
[58] Field of Search .................. 73/861.61, 861.62, 73/861.52, 198; 138/38, 39, 40, 44

[56] References Cited

U.S. PATENT DOCUMENTS

| | | | |
|---|---|---|---|
| 1,503,371 | 7/1924 | Meyer | 138/40 |
| 1,702,274 | 2/1929 | Schmidt | 138/40 |
| 1,923,118 | 8/1933 | Ruder et al. | 138/40 |
| 2,687,645 | 3/1950 | Velten et al. | |
| 3,602,423 | 8/1971 | Mulready | 138/40 |
| 3,750,710 | 8/1973 | Hayner | 138/40 |
| 3,838,598 | 10/1974 | Tompkins | 73/205 |
| 4,015,473 | 4/1977 | Kleuters et al. | 73/205 |
| 4,040,293 | 8/1994 | Wilson | 73/211 |
| 4,562,744 | 1/1986 | Hall et al. | 73/861.02 |
| 4,592,390 | 6/1986 | Boyd | 138/45 |
| 4,800,754 | 1/1989 | Korpi | 138/40 |
| 4,841,781 | 6/1989 | Khalifa | 73/861.22 |
| 5,341,848 | 8/1994 | Laws | 138/40 |

*Primary Examiner*—Richard Chilcot
*Assistant Examiner*—William L. Oen
*Attorney, Agent, or Firm*—Baker & Botts

[57] ABSTRACT

A flow impedance device is provided for an obstruction flowmeter for determining the flow rate of a compressible or incompressible fluid in a conduit. The flowmeter preferably includes means for measuring the temperature and pressure of the fluid as well as the pressure differential across the flow impedance device along with further means for computing a flow rate from the measured pressures. The flow impedance device may include a plate having a plurality of elongated openings arranged in a predetermined pattern. The plate is installed generally transverse to fluid flow in the conduit to force the fluid to flow through the plurality of elongated openings.

7 Claims, 2 Drawing Sheets

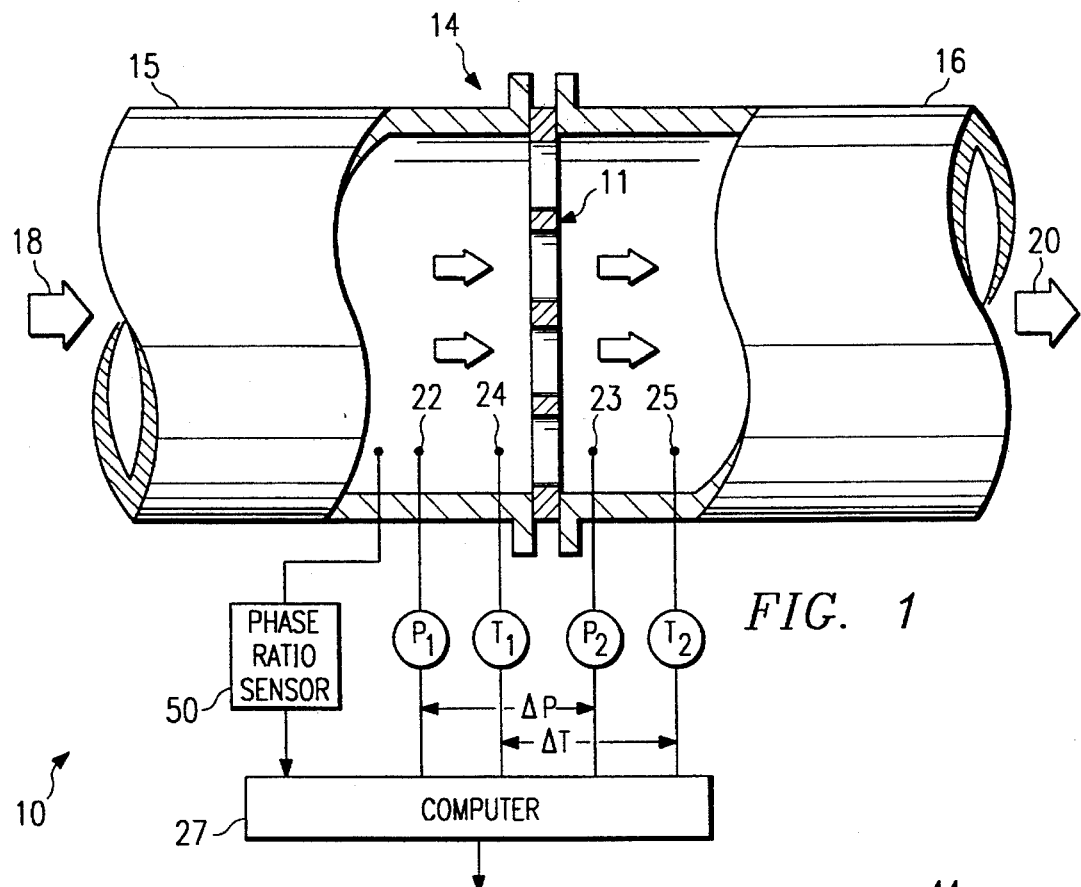
FIG. 1
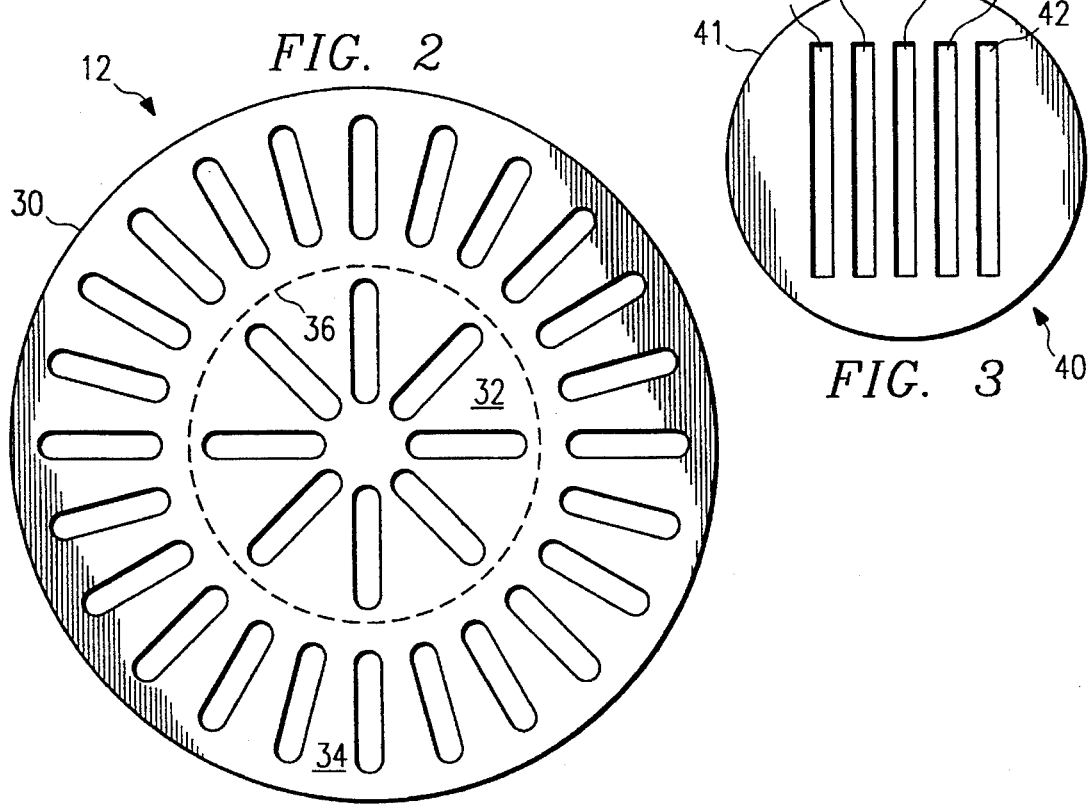
FIG. 2
FIG. 3

SLOTTED ORIFICE FLOWMETER

RELATED APPLICATION

This application is a continuation-in-part application of U.S. application Ser. No. 07/729,934 filed Jul. 15, 1991 by Kenneth R. Hall, Gerald L. Morrison and James C. Holste now U.S. Pat. No. 5,295,397.

TECHNICAL FIELD OF THE INVENTION

This invention relates in general to the field of flow measurement instrumentation. More particularly, the present invention relates to a slotted orifice flowmeter for measuring the flow rate of a fluid.

BACKGROUND OF THE INVENTION

Flowmeters are presently dominated by designs using an orifice as the flow impedance device. Obstruction flowmeters of this type typically use a baffle plate having a circular opening installed transversely in the conduit. The fluid is forced to flow through the orifice, creating a pressure drop across the plate. The differential pressure is then measured across the orifice, which, along with stream pressure and temperature, are used to compute the flow rate with formulas as known in the art. Alternatively, the flow rate may be computed more accurately by also measuring the temperature differential across the orifice. One such flow rate measuring device is described in U.S. Pat. No. 4,562,744, issued to Hall et al., incorporated herein by reference.

Although the design and construction of a single orifice is simple, its accuracy is highly sensitive to upstream and downstream flow conditions. Consequently, devices commonly called flow conditioners or straighteners are required to eliminate any swirling or other flow field disturbances in the fluid flow upstream of the orifice. In addition, long straight meter runs are required upstream of the flowmeter to reduce unfavorable flow conditions which may affect the accuracy of the flowmeter as well as straight runs downstream.

Another drawback in introducing the normal orifice in the path of fluid flow is that the progression of the fluid is significantly disrupted. While it is desirable to minimize the area of the orifice, such a minimization increases the pressure drop across the orifice. A significant distance downstream from the orifice may be required for maximum recovery of this pressure.

Therefore, it is desirable to provide a flow impedance device for a flowmeter which overcomes the disadvantages associated with the standard single orifice design. More specifically, it is desirable to eliminate the requirement of flow conditioning and to reduce or minimize any pressure drop across the flow impedance device without sacrificing the accuracy of the resulting flow rate measurement.

SUMMARY OF THE INVENTION

In accordance with the present invention, a slotted orifice flowmeter is provided which substantially eliminates or reduces disadvantages and problems associated with prior flow rate measurement devices.

In one aspect of the present invention, a flow impedance device is provided for a flowmeter for determining the flow rate of a fluid in a conduit. The flowmeter includes means for measuring the pressure and temperature of the fluid as well as the pressure differential across the flow impedance device and further means for computing a flow rate from the measurements. The flow impedance device includes a plate having a plurality of elongated openings arranged in a predetermined pattern. The plate is installed generally transversely in the conduit to force the fluid to flow through the plurality of elongated openings.

In another aspect of the present invention, a method is provided for measuring the flow rate of a fluid in a conduit. A flow impedance is created in the conduit by forcing the fluid to flow through a plurality of narrow openings distributed uniformly across the cross-sectional area of the conduit, and the pressure and temperature of the fluid as well as the pressure differential across the flow impedance are measured. The flow rate is then computed from the measurements.

A primary technical advantage of one aspect of the present invention provides a flow impedance device that can be used to upgrade existing obstruction flowmeters to obtain more accurate measurements. The upgrading effort may merely include replacing the existing flow impedance device with the slotted orifice while preserving and reusing the remaining flowmeter parts.

An important technical advantage of another aspect of the present invention provides for flow rate measurement the accuracy of which is relatively insensitive to upstream and downstream flow conditions.

An important technical advantage of yet another aspect of the present invention is the less disruptive manner that is used to impede the fluid flow. Therefore, fluid pressure, for example, recovers more readily and within a shorter distance from the flowmeter, and incurs less unrecoverable pressure drop than with a conventional orifice.

An advantage of still another aspect of the present invention is that it allows a direct flow measurement of a multiphase fluid without requiring phase separation.

Further advantages of the present invention may be appreciated upon examining the specification and claims below.

BRIEF DESCRIPTION OF THE DRAWINGS

For a better understanding of the present invention, reference may be made to the accompanying drawings, in which:

FIG. 1 is a diagrammatic view in elevation and in section with portions broken away of a flowmeter using an orifice constructed in accordance with the present invention;

FIG. 2 is a frontal view of the orifice having one possible slot geometry and arrangement;

FIG. 3 is a frontal view of an alternate embodiment of the orifice;

DETAILED DESCRIPTION OF THE INVENTION

Figure 4A:
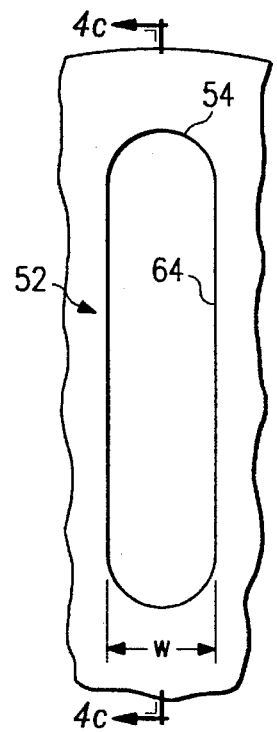
FIG. 4a is a frontal view of a flat-edged slot for use in the orifices of FIGS. 2 and 3.

The illustrative embodiments of the present invention are best understood by referring to FIGS. 1–5c, wherein like numerals are used for like and corresponding parts of the various drawings.

With reference to the drawings, FIG. 1 illustrates a flowmeter 10 using a slotted orifice 11 constructed according to the teachings of the present invention. Flowmeter 10 includes a conduit section 14, which may consist only of slotted orifice 11, having the same inner cavity diameter as the conduit or pipe 15 and 16 carrying a flowing fluid. As discussed below, flowmeter 10 is applicable to either compressible or incompressible fluid applications. The direction of the flow is indicated by arrows 18 and 20 upstream and downstream of flowmeter 10, respectively.

Portions of conduit sections 15 and 16 are shown in cross-section to illustrate the position of slotted orifice 11 with respect to pressure sensors 22 and 23 and temperature sensors 24 and 25. Slotted orifice 11 is installed generally transversely so that the plane of slotted orifice 11 is generally perpendicular to the fluid flow. In this manner, the fluid is forced to flow through the plurality of openings in slotted orifice 11, thus creating a pressure and temperature differential across slotted orifice 11. The plurality of openings in slotted orifice 11 are described in more detail below. The pressure and temperature measurements obtained by sensors 22–25 are then provided to a computer 27, which is programmed to compute the flow rate of the fluid from the measurements using conventional equations as known in the field of flow rate measurement.

Alternatively, slotted orifice 11 may be housed independently in a short section of conduit or between flanges of conduit sections 15 and 16 as shown. Replacing conventional flow impedance devices merely constitutes dropping slotted orifice 11 into place and securing it therein, without having to replace pressure and temperature sensors 22–25. It is also important to note that certain known equations for computing the flow rate do not require a knowledge of the temperature differential across the flow impedance device, and therefore do not require temperature sensors 24 and 25. This does not prevent the advantageous use of slotted orifice 11, as it may be used in any flowmeter that uses a flow impedance device to create a pressure differential to compute either a mass or volume flow rate.

Referring to FIG. 2, a preferred geometry of slotted orifice 11 is shown as a slotted orifice 12. Slotted orifice 12 is embodied in a circular plate 30, the thickness of which may vary depending upon conduit diameter and upstream flow conditions. For example, plate thickness may vary between 1/8" to 3/8" for a 2" diameter conduit. Circular plate 30 is preferably constructed of rigid and non-corrosive materials that are commonly used to construct conventional flow impedance devices.

Circular plate 30 comprises a plurality of slots or elongated openings arranged in a predetermined pattern and geometry. Conceptually, circular plate 30 may be divided into an inner circle 32 and an outer annulus or ring 34, where the radius of inner circle 32 is one half of the radius of circular plate 30. Circular plate 30 is therefore divided into two sections where dashed line 36 indicates the division line. From simple geometry, the area of inner circle 32 is one-third of the area of outer ring 34. As shown in FIG. 2, inner circle 32 encompasses eight (8) slots and outer ring 34 has twenty-four (24) substantially identical size and geometry slots, realizing a one to three ratio. In other words, the total area of the slot openings in inner circle 32 is one-third that of the slot openings in outer ring 34, so that the slot areas of each respective section are directly proportional to the surface areas of inner circle 32 and outer ring 34. In this arrangement, a substantially uniform flow field is obtained across slotted orifice 12.

The geometry described above can be expanded to other arrangements in which the area of circular plate 30 is subdivided into multiple subsections, and each subsection has the number of slots proportional to its area with respect to other subsections. For example, circular plate 30 may be divided conceptually by three concentric circles into an outermost ring, a middle ring and an inner circle, where the area of the outermost ring is five times the area of the inner circle and the area of the middle ring is three times the area of the inner circle. A possible arrangement to obtain a uniform flow field would be to provide an inner circular row of X number of slots, 3X substantially identical slots in the next circular row, and 5X substantially identical slots in the outermost circular row.

Equation (1) shows the basic geometrical relationship for the above-described geometry, where Acs is the combined area of the slots in the inner circle, Ars is the combined area of the slots in an outer ring, Ac is the area of the inner circle, and Ar is the area of the outer ring:

$$\frac{Ars}{Acs} Ais = \frac{Ar\,Ac}{Ac} \qquad (1)$$

Equation (1) can be mathematically manipulated to provide other geometrical relationships as well.

The preferred shape of the slots in circular plate 30 is rectangular with semi-circular ends, although other similar shapes are contemplated. For example, the slots may be rectangular with square ends, or generally oblong in shape as long as all slots have substantially the same properties. In addition, for certain applications, the slots could be long vertical slits of equal length. Slot geometry is discussed in more detail below.

Although orifice 12 is shown as circular, the geometry of orifice 12 may be modified, in accordance with the present invention, to conform with the cross-sectional geometry of the conduit into which orifice 12 is to be installed. For example, a square slotted orifice (not shown) may be constructed according to the present invention for installation into a conduit with a square cross-section. This square orifice would have a square inner region in the center of a square orifice plate and at least one square outer region concentric with the inner region. For example, a square orifice with one outer region has an inner region with a width one half of the plate. Orifices having other geometries, such as triangular, etc., may also be constructed in accordance with the above-described principles of the present invention.

Furthermore, the slot geometry and arrangement pattern of a non-circular orifice may be modified to achieve relatively the same effect (a uniform flow field through the orifice) as the slot geometry and arrangement pattern of orifice 12. As in the case of circular orifice 12, the ratio of the total slot area in an outer region to the total slot area of the inner region would equal the ratio of the area of the outer region, i.e., the outer area, to the area of the inner region, i.e., the inner area. Thus, this relationship is consistent with equation (1). Because all the slots are substantially identical, the ratio of the number of slots in the outer region to the number of slots in the inner region would also be equal to the ratio of the outer area to the inner area. Also, the slots may be uniformly distributed within their respective regions.

Referring to FIG. 3, an alternate embodiment 40 of slotted orifice 11 is shown. Slotted orifice 40 comprises a circular plate 41 having a series of slots 42–46. Slots 42–46 are rectangular openings preferably having substantially equal widths and lengths, and are arranged in a row substantially parallel to one another.

Slotted orifice 40 is suited to certain applications such as flow-rate measurement of non-homogenous fluids. A non-homogeneous fluid exists in multiple phases. Typically, a first portion of the fluid is in a vapor phase and a second portion of the fluid is in a liquid phase.

Prior flowmeters require upstream separation of the vapor from the liquid. Such flowmeters then separately measure the flow rates of the vapor and liquid phases; the total flow rate can be determined from the phase flow rates. The separated vapor and liquid are then returned to the conduit down stream from the flowmeter.

Slotted orifice 40 allows flowmeter 10 to measure the flow rate of a non-homogeneous fluid directly. That is, flowmeter 10 need not separately measure the flow rates of the vapor and liquid phases. The arrangement and dimensions of slots 42–46 allow orifice 40 to pass therethrough the vapor and the liquid in the same proportion as exists in the conduit. By measuring the upstream vapor-to-liquid ratio with phase-ratio sensor 50 (in addition to measuring the upstream and downstream pressures with sensors P1 and P2), computer 27 can calculate the flow rate of a two-phase fluid flowing through conduit sections 15 and 16.

Although slotted orifice 40 is shown with five rectangular slots 42–46, the number and geometry of the slots may vary without altering the inventive concept. As with orifice 12 of FIG. 2, the geometry of orifice 40 may be altered to conform with the cross-sectional geometry of conduit section 14, although the arrangement of slots 42–46 would remain substantially parallel. The preferred shape of the slots of orifice 40 is rectangular with flat ends, although other similar shapes are contemplated, such as rectangular with semi-circular ends.

Generally, for both orifices 12 and 40, all slots should pass fluid at generally the same rate and cause substantially the same pressure drop. Additionally, the hydraulic diameter of all slots should be equal. The hydraulic diameter is a numeric figure indicative of the characteristic length of flow for an opening, and is equal to four times the area of the opening divided by the wetted perimeter of the opening. Therefore, the hydraulic diameter for the slots shown can be expressed as:

$$HD = \frac{w(4L + \pi w)}{2L + \pi w} \quad (2)$$

where HD is the hydraulic diameter, and w and L are the width and length of the slots, respectively. Optimally, the slot shape is long and narrow, thus making the optimal HD approach 2w.

The performance equation of slotted orifice 12 of the preferred embodiment of the present invention may be expressed by:

$$V = \frac{C_D}{\sqrt{1-\beta^4}} A_{slots} \sqrt{\frac{2\Delta P}{\rho}} \quad (3)$$

where $$\beta = \frac{A_{slots}}{\sqrt{A_{pipe}}} \quad (4)$$

and V is the volumetric flow rate, $C_D$ is the discharge coefficient, $A_{slots}$ is the combined area of the slots, $A_{pipe}$ is the cross-sectional area of the pipe or conduit, $\rho$ is the fluid density, and $\Delta P$ is the pressure differential across slotted orifice 12. The performance equation may be written in terms of the mass flow rate:

$$m = \frac{C_D}{\sqrt{1-\beta^4}} A_{slots} \sqrt{2\rho\Delta P} \quad (5)$$

where m is the mass flow rate.

Figure 4B:
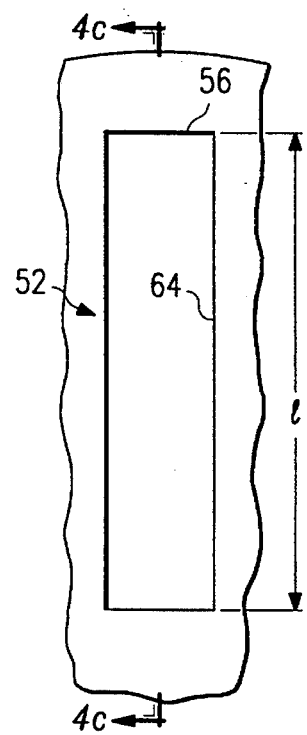
FIG. 4b is a cut-away side view of the FIG. 4a slot.
Figure 4C:
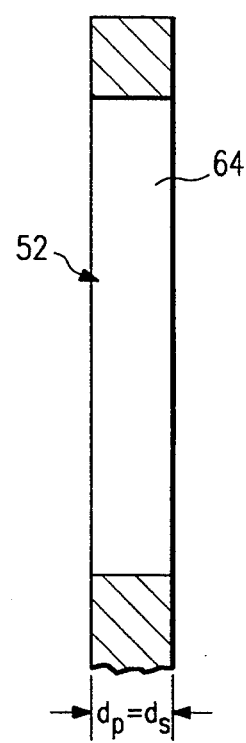
Figure 5A:
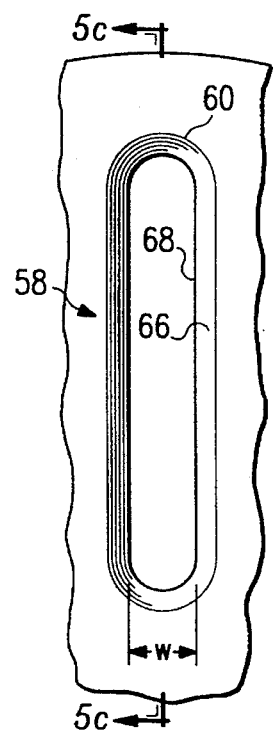
FIG. 5a is a frontal view of a slot with a partially-beveled edge for use in the orifices of FIGS. 2 and 3.
Figure 5B:
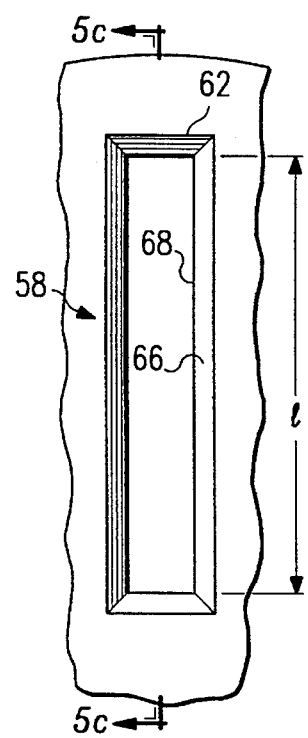
FIG. 5b is a cut-away side view of the FIG. 5a slot.
Figure 5C:
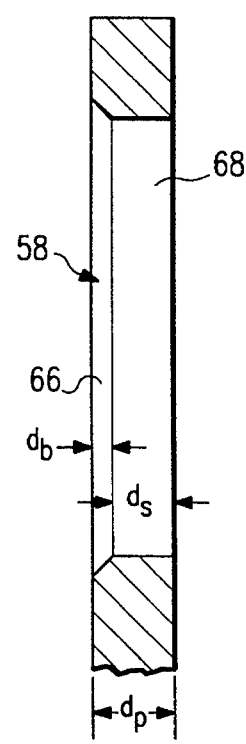

FIGS. 4a–5c are exploded views of alternative slots for use with orifices 12 and 40 of FIGS. 2 and 3. FIGS. 4a–c are front and side views of a flat-edged slot 52 having either semi-circular ends 54 (FIG. 4a) or straight ends 56 (FIG. 4b). FIGS. 5a–c are front and side views of a bevel-edged slot 58 having partially beveled edges and either semi-circular ends 60 (FIG. 5a) or straight ends 62 (FIG. 5b).

Referring to FIGS. 4a–c, length L (for the straight-end slot 52 of FIG. 4b), width w, flow area A, slot depth ds, and plate depth dp are shown for slot 52 having flat edges 64. Ideally, ds=dp=3w, and A=4w² for both a semi-circular-end and straight-end slot 52. For a straight-end slot 52, length L=4w.

For example, for a straight-end or semi-circular-end slot 52, if w=1 millimeter (mm), then A=4 mm², and ds=dp=3 mm. For a straight-end slot 52, L=4 mm.

Referring to FIGS. 5a–c, L (for the straight-end slot 58 of FIG. 5b), w, A, ds, dp, and the perpendicular depth db of a beveled portion 66 (the projection of beveled portion 66 on a plane perpendicular to the plate) are shown for a slot 58 having an edge with beveled portion 66 and a flat portion 68. Additionally, beveled portion 66, which is shown as a straight bevel, may be a round bevel. As shown, L (for the straight-end slot 58 of FIG. 5b) and w are defined as the perpendicular distances between respective pairs of opposing sections of flat portion 68. A is the flow area bounded by flat portion 68, and ds is defined as the thickness of flat portion 68. Ideally, A= 4w², ds=3w, and dp=ds+db for both a semi-circular and straight end slot 58. For a straight-end slot 58, L=4w.

For example, for a straight or semi-circular end slot 58, if w=1 mm and db=1 mm, then A=4 mm², ds=3 mm, and dp=4 mm. For a straight-end slot 58, L=4 mm.

In operation, by reducing flow disturbances in a fluid as it flows therethrough, an orifice, such as orifice 12 or orifice 40, having slots 52 or 58, allows flowmeter 10 to render flow measurements of the fluid that are substantially or totally unaffected by these disturbances, which are typically caused upstream. In contrast, prior orifices often do not reduce these disturbances, which may cause significant fluctuations in the flow measurements made by flowmeters using these prior orifices. In order to render accurate measurements unlike flowmeters using prior orifices, flowmeters using prior orifices typically require upstream flow straighteners to reduce these disturbances. Thus, flowmeters using an orifice constructed according to the present invention can accurately operate without flow straighteners.

Although the present invention has been described in detail, it should be understood that various changes, substitutions and alterations can be made thereto without departing from the spirit and scope of the present invention as defined by the appended claims.

What is claimed is:

1. A flow impedance device for conditioning a flow of a multi-phase fluid through a flowmeter for determining the rate of the flow in a conduit having a circular cross-section, the flow impedance device comprising:

a circular plate defining a plurality of substantially parallel slots each having an area, a depth and a width;

wherein said area substantially equals four times said width squared; and wherein said plate is installed in the conduit such that the fluid flows through said slots.

2. The device of claim 1 wherein said depth substantially equals three times said width.

3. The device of claim 1 wherein said slots have flat edges.

4. The device of claim 1 wherein each of said slots has an edge with beveled and flat portions, said width measured between opposing sections of said flat portion.

5. The device of claim 4 wherein said depth equals the thickness of said flat portion.

6. The device of claim 1 wherein said slots have semicircular ends.

7. The device of claim 1 wherein said slots have straight ends.

* * * * *